United States Patent [19]

Gaylor et al.

[11] Patent Number: 4,576,722

[45] Date of Patent: Mar. 18, 1986

[54] SCALE AND SLUDGE COMPOSITIONS FOR AQUEOUS SYSTEMS

[75] Inventors: Lawrence A. Gaylor, Chagrin Falls; James W. Beard, University Heights, both of Ohio

[73] Assignee: The Mogul Corporation, Chagrin Falls, Ohio

[21] Appl. No.: 699,220

[22] Filed: Feb. 7, 1985

Related U.S. Application Data

[63] Continuation of Ser. No. 468,771, Feb. 22, 1983, abandoned, which is a continuation of Ser. No. 302,186, Sep. 14, 1981, abandoned, which is a continuation of Ser. No. 121,597, Feb. 14, 1980, abandoned.

[51] Int. Cl.$^4$ .................................... C02F 5/14
[52] U.S. Cl. .................................. 210/699; 210/701; 252/180
[58] Field of Search .................... 210/698, 699, 701; 252/180, 181

[56] References Cited

U.S. PATENT DOCUMENTS

| | | | |
|---|---|---|---|
| 3,085,916 | 4/1963 | Zimmie et al. | 210/701 |
| 3,630,937 | 12/1971 | Baum et al. | 210/698 |
| 3,666,664 | 5/1972 | Lorenc et al. | 210/699 |
| 3,890,228 | 6/1975 | Hwa et al. | 210/700 |
| 3,959,167 | 5/1976 | Hwa et al. | 252/180 |
| 3,959,168 | 5/1976 | Germscheid et al. | 252/180 |
| 4,011,171 | 3/1977 | Lorenc et al. | 252/180 |
| 4,026,815 | 5/1977 | Kallfass et al. | 252/180 |
| 4,042,324 | 8/1977 | Avel et al. | 210/699 |
| 4,048,066 | 9/1977 | Cuisia et al. | 210/701 |
| 4,062,796 | 12/1977 | Gardner et al. | 252/180 |
| 4,105,551 | 8/1978 | Smith et al. | 210/701 |
| 4,164,574 | 8/1979 | Quinlan | 252/180 |
| 4,166,041 | 8/1979 | Goodman | 252/180 |
| 4,172,787 | 10/1979 | Ries et al. | 210/699 |
| 4,209,398 | 6/1980 | Ii et al. | 252/181 |
| 4,255,259 | 3/1981 | Hwa et al. | 210/699 |

FOREIGN PATENT DOCUMENTS 2023121 12/1979 United Kingdom ............... 252/180

*Primary Examiner*—Peter Hruskoci
*Attorney, Agent, or Firm*—Fay, Sharpe, Fagan, Minnich & McKee

[57] ABSTRACT

This invention relates to a method of inhibiting the deposition of scale and sludge in aqueous systems by incorporating into the water effective amounts of a scale inhibiting compound, i.e. 2-phosphonobutane-1,2,4-tricarboxylic acid, and a dispersing amount of a polymeric sludge conditioner comprising one or more substantially water soluble polymeric dispersants such as the acrylic acid polymers.

3 Claims, No Drawings

SCALE AND SLUDGE COMPOSITIONS FOR AQUEOUS SYSTEMS

This application is a continuation of application Ser. No. 468,771 filed Feb. 22, 1983 now abandoned which is a continuation of application Ser. No. 302,186, filed Sept. 14, 1981, now abandoned, which, in turn is a continuation of application Ser. No. 121,597, filed Feb. 14, 1980, which is now abandoned.

This invention is directed to a method of inhibiting the deposition of scale and sludge in aqueous systems which comprises adding to such systems effective amounts of a particular phosphonate and at least one substantially water soluble polymer.

BACKGROUND

Most commercial water contains alkaline earth metal cations such as calcium; magnesium, and various anions such as the bicarbonate, carbonate, sulfate, silicate, phosphate, etc. Combinations of these ions in concentrations exceeding their solubility form precipitates which deposit in the system, e.g. boiling water system. As these ions precipitate from the water, they can form scale on the surfaces which prevents effective heat transfer, and increases the corrosion process. The accumulation of scale, particularly in boiling water systems, is an expensive and tremendous problem in most industrial water systems, causing delays and shutdowns, requiring many manhours in cleaning and removal.

The term "scale" as used herein, includes deposits formed on the surface in contact with aqueous mediums due to the precipitation of metal ions from the water. Water containing ionized scale forming components is used in many domestic and industrial applications for a variety of purposes and because the water is from a variety of sources the scale forming components that precipitate on the surfaces also vary in quantity and type. It has been found, however, that the deposition of scale on the surfaces in contact with the water can be substantially inhibited by utilizing a certain composition to effectively inhibit the formation of scale. The inhibitor present in the water reacts with the scale forming components and alters the crystalline character and amount of precipitate formed, thus inhibiting scale formation.

The use of various scale forming materials to prevent precipitation by inactivating the cations with certain compounds, e.g. phosphonates, is known in the art, see for example, Hatch and Rice, "Industrial Engineering Chemistry", Vol. 31, page 51 and "Journal of Physical Chemistry", Vol. 44, No. 5, (May, 1940). More particularly, various organic phosphonates, including the nitrogen-containing phosphonic acids, especially the N-substituted phosphonic acids have been used in aqueous sytems not only as corrosion inhibitors, but as scale preventing agents. These materials, however, are more difficult to obtain and have a tendency to precipitate in acidic mediums. Other carboxy-containing acids are the phosphonosuccinic acids which have been used as boiler-water scale inhibitors; see German Specifications 2,225,645 and 2,015, 068. Moreover, combinations of various phosphonates with organic polymers have been used in boiler water as taught by U.S. Pat. No. 3,959,167. Other phosphonates in combination with certain amines are disclosed in U.S. Pat. Nos. 3,666,664 and 4,011,171. Thus, the current technology for preventing the deposition of scale by using organophosphonic acids is well documented and it has been demonstrated that phosphonates in boiler water will reduce the amount of scale on the heat transfer surfaces. The phosphonate treatment promotes the formation of a fluid sludge in the water which can be effectively conditioned and removed by boiler blowdown.

It is, therefore, an object of this invention to provide a novel composition which can be used to inhibit scale and promote the formation of fluid sludge in aqueous systems and particularly in boiler water systems. It is another object of this invention to provide a unique combination of a substantially water soluble polymer such as an acrylic acid polymer and a particular phosphonotricarboxylic acid. These and other objects of the invention will become apparent from a further and more detailed description of the invention as follows.

SUMMARY

In accordance with this invention, it has been found that a certain combination of 2-phosphonobutane-1,2,4-tricarboxylic acid and the various metal salts thereof, with an effective amount of a substantially water soluble polymer, e.g. particularly acrylic acid polymers can be used to inhibit scale formation and condition the sludge formed to protect various aqueous systems and particularly boiler water systems. More particularly, it has been found that the deposition of scale in aqueous systems can be inhibited by incorporating into the water passing through the system a scale-inhibiting amount of 2-phosphonobutane-1,2,4-tricarboxylic acid and a dispersing amount of at least one substantially water soluble polymeric sludge conditioner selected from the group consisting of acrylic acid polymers, methacrylic acid polymers, copolymers of acrylic and methacrylic acid and sulfonated styrene-maleic anhydride copolymers.

The substantially water soluble polymers, e.g. acrylic acid polymers, are added or maintained in the water in effective amounts ranging from about 0.01 to 500 parts by weight per million parts by weight of the water and more particularly amounts ranging from about 0.1 to 100 parts by weight per million parts by weight of the water. The phosphonotricarboxylic acid is added or maintained in the system in an amount ranging from about 0.01 to 100 parts by weight and more particularly in amounts ranging from about 0.1 to 50 or 0.5 to 10 parts by weight per million parts by weight of the water. The phosphonate may be characterized as having the formula:

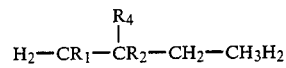

where $R_1$, $R_2$, and $R_3$ are —COOH groups and $R_4$ is —PO$_3$H$_2$.

The organic polymers particularly useful in accordance with this invention are the polymers having the formula

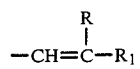

where R is selected from the group consisting of hydrogen or a methyl radical and $R_1$ is selected from the group consisting of nitrile or carboxyl radicals, e.g. water soluble salts, etc. More particularly, the acrylic polymers include the homopolymers and copolymers of acrylic acid, methacrylic acid and various physical mixtures or combinations thereof. The polymers may have molecular weights at least about 1000 but may range as high as ten million and generally range from 10,000 to one million and are particularly useful when the molecular weights range from about 1,000 to 100,000.

DETAILED DESCRIPTION

To demonstrate the utility of this invention for preventing boiler scale, various tests were carried out in a pressurized research boiler and in an atmospheric pressure testing apparatus. The pressurized boiler consists of a steam drum having an operating volume of approximately 57 liters, a mud drum, three steam generating risers and a central downcomer. The Unit is constructed of low carbon steel. Heat is provided by external electric heaters clamped to each of the three riser sections, with a total power of 42,000 watts. The circulation of the boiler water throughout the system is maintained at 6 gpm by means of a recirculating pump. Operating pressure of the boiler can be varied mechanically between 15 to 600 psig. The steam rated for most tests was approximately 7.5 kgs of steam per hour.

Provisions for varying the feed water chemistry were accomplished by diluting the raw water with deionized water. Chemicals can be added to the water to achieve the desired feed water quality. Boiler water conditions were maintained by adjusting an automatic blowdown control valve. Typical feed water and boiler water compositions were maintained in accordance with the following:

TABLE I

| Parameters | WATER CHEMISTRY | |
|---|---|---|
|  | Feed Water | Boiler Water |
| pH | 7.0 | 11.7 |
| Chloride | 65.0 | 330 |
| Hydroxyl Alkalinity (as calcium carbonate) | 0 | 400 |
| Total Alkalinity (as calcium carbonate) | 110 | 580 |
| Total Hardness (as calcium carbonate) | 20 | less than 0.2 (filtered) |
| Magnesium Hardness (as calcium carbonate) | 6 | less than 0.1 (filtered) |
| Total Solids (mg per liter) | 490 | 2970 |
| Suspended Solids | less than 1 | less than 10–80 |

TABLE I-continued

| Parameters | WATER CHEMISTRY | |
|---|---|---|
|  | Feed Water | Boiler Water |
| (mg per liter) | | |

The tests were conducted for periods of approximately 500 hours after the boiler had reached the desired test pressure. All tests were run at about 500 to 580 psig. During the test, the boiler water chemistry and the concentration of the test materials were maintained by the automatic blowdown system and by the addition of the additives for external holding tanks to make up for the chemical loss through blowdown. At the end of the test, the unit was allowed to cool and the boiler water was drained. Six test sections from the steam generating riser assemblies were then removed and washed with warm, 7% hydrochloric acid. Three of the test sections are referred to as "hot sections" since they have the above mentioned heater blocked clamps around them and three of the test sections were referred to as "cold sections" since they have no external heat source immediately contacting their surfaces. Each test section has an internal surface area of 0.036 $m^2$. The acid washes were adjusted to a standard volume of 3,000 ml. and analyzed by atomic absorption spectrophotometry for calcium, magnesium, silica and iron. In addition, the phosphate concentration was determined by standard colorimetric methods.

In order to compare the results obtained from different tests, the analytical data from three "hot sections" and the data from the three "cold sections" were combined and the final results are expressed in terms of equivalents of scaling ion per square meter of test section surface area per hour of testing ($EPM/m^2/hr.$). This term is referred to as the deposition rate.

Suspended solids in the boiler water were also determined. Since precipitation of solids was continuous, increases in suspended solids was indicative of decreases in scaling on the heat transfer surfaces.

An illustration of the effectiveness of the compositions of this invention is set forth in Table II.

TABLE II

| | DEPOSITION RATES AND SUSPENDED SOLIDS | | | |
|---|---|---|---|---|
| Examples | Treatment | Concentration | Total Deposition Rate $EPM/m^2/hr.$ | Suspended Solids in Boiler Water (mg/l) |
| I | (A) 2-Phosphonobutane-1,2,4 Tricarboxylic Acid | 5.0 ppm | 2.79 | 30.9 |
| II | (A) 2-Phosphonobutane-1,2,4 Tricarboxylic Acid | 5.0 ppm | 2.16 | 45.3 |
|  | (B) Polyacrylic Acid | 8.0 ppm | | |
| III | (A) 2-Phosphonobutane-1,2,4 Tricarboxylic Acid | 4.8 ppm | 1.09 | 48.3 |
|  | (B) Polyacrylic Acid | 4.8 ppm | | |
|  | (C) Styrene Sulfonate Maleic Anhydride Copolymer | 7.6 ppm | | |
| IV | (A) Hydroxyethylidene Diphosphonic Acid | 10.7 ppm | 2.54 | 3.4 |
| V | (A) Polymaleic Anhydride | 5.7 ppm | 3.75 | 2.5 |
| VI | (A) Hydroxyethylidene Diphosphonic Acid | 4.4 ppm | 2.75 | 33.7 |
|  | (B) Polymethacrylic Acid | 7.0 ppm | | |

It should be noted from the data in Table II that the use of 2-phosphonobutane-1,2,4-tricarboxylic acid alone, in five parts per million, gave a deposit rate of 2.79 with a suspended solids in the boiler water of 30.9 mg/liter. When incorporating a polyacrylic acid into the system with the 2-phosphonobutane-1,2,4-tricarboxylic acid, the deposit rate of scale decreased to 2.16 and the suspension of solids increased to 45.3 mg/liter.

More particularly, when a combination of a polyacylic acid and a styrene-sulfonate-maleic anhydride copolymer were used with the 2-phosphonobutane-1,2,4-tricarboxylic acid, the deposit rate substantially decreased to 1.09 and the suspended solids increased to 48.3 mg/liter.

Thus, it is evident that the combination of the 2-phosphonobutane-1,2,4-tricarboxylic acid with one or more water soluble polymers, e.g. polyacrylic acid not only decreases the rate of scale deposition, but also increases the amount of solids suspended which allows for easy removal of the sludge.

When using other phosphonates, e.g. hydroxyethylidene diphosphonic acid, the rate of deposit of the scale substantially increased to 2.54 and the suspended solids substantially decreased to only 3.4. Similarly, when other polymers such as polymaleic anhydride were used, the deposition rate of the scale again increased to 3.75 and the rate of solids suspended decreased to only 2.5 mg/liter. Still further, it should be noted that other phosphonic acids, e.g. hydroxyethylidene diphosphonic acid in combination with polymethacrylic acid had a higher deposition rate of scale of 2.75 and a suspended solid rate of 33.7 mg/liter. Thus, it is evident that other water soluble polymers in combination with various phosphonic acids failed to give a higher degree of suspended solids and moreover failed to inhibit the deposition of scale as shown in Examples 2 and 3 of this invention in Table II.

The apparatus for the atmospheric pressure test consisted of a one liter stainless steel container with a stainless steel, 300 W heater immersed in the test water. The heater served as the test heat transfer surface. Water chemistry was controlled through automated blowdown and automated chemical feed pumps. Condensate was continually removed. Scale that formed on the heater probe was removed with acid and analyzed by atomic absorption for calcium, magnesium and silica ions. The total amount these ions is a direct indication of the amount of scaling that occurred in the test. This can be also expressed as a percentage reduction in the scale amount that occurs if no treatment is used.

In testing the polymeric dispersants and the various phosphonates for purposes of scale inhibition and sludge conditioning comparisons were made between the products being tested based on: (1) The calcium, magnesium, and silica content of the heating probe scale, (2) The calcium, magnesium and silica content of the boiler water, (3) The boiler water suspended solids and (4) The crystal structure of the boiler sludge. Of these measurements, the most important is the total amount of calcium, magnesium and silica found on the heating probe. This number is a direct indication of the degree of scale formation.

TABLE III

TOTAL SCALE AND PERCENT SCALE REDUCTION IN ATMOSPHERIC PRESSURE BOILER

| Examples | Treatment | Most Effective Concentrate | Total Scale Ions (mg) | % Scale Reduction |
|---|---|---|---|---|
| I | None | — | 11.5 | 0 |
| II | 2-Phosphonobutane-1,2,4 Tricarboxylic Acid | 5.0 ppm | 7.6 | 51 |
| III | Polymaleic Anhydride | 1.0 ppm | 8.2 | 40 |
| IV | Hydroxyethylidine Diphosphonic Acid | 5.0 ppm | 8.3 | 39 |
| V | Polyacrylic Acid | 1.0 ppm | 8.6 | 34 |
| VI | Styrene Sulfonate Maleic Anhydride Copolymer | 5 ppm | 8.9 | 29 |

It should be noted from the data in Table III that 2-Phosphonobutane-1,2,4-Tricarboxylic acid decreases scale substantially more than polmaleic anhydride, hydroxyethylidene diphosphonic acid, polyacrylic acid or styrene sulfonate maleic anhydride copolymer. The phosphonocarboxylic acid decreased scale by 51%, whereas polymaleic anhydride reduced scale by only 40%.

The polymeric water soluble polymers used in combination with the phosphonotricarboxylic acid include known polymers such as the homopolymers and copolymers of sulfonated styrene with olefins, acrylic or methacrylic acid and the various water soluble salts. In addition, physical mixtures may be used including, for example, the polyacrylic or methacrylic acids with polystyrene-sulfonic acid. The use of phosphonotricarboxylic acid as the precipitating agent for the components or ions causing the scale in combination with the sludge conditioner, maintains the boiler sludge in a fluid state for effective removal.

In theory, the phosphonotricarboxylic acid is converted to its corresponding alkali metal or alkaline earth metal salt by replacing at least half of the hydrogen ions in the acid group with the appropriate metal ions. The scale inhibitor of this invention has exhibited good results even at high temperatures, e.g. boiler water temperatures, when compared to a number of other materials, e.g. at temperatures that range from about 130° to 350° F. Thus, when utilizing the phosphonobutane-1,2,4-tricarboxylic acid in amounts as low as 0.01 part per million and as high as 100 parts per million, the scale formation is effectively inhibited. The presence of the polymeric dispersant modifies the sludge that forms in the system enabling it to be readily removed with the flow of the water through the system.

In addition to the phosphonotricarboxylic acid and the water soluble polymers, other ingredients employed in boiler water or cooling water treatments may be incorporated in the system. These include various compounds such as biocides, corrosion inhibitors, etc. The exact point at which the additives are incorporated into the system is not critical, however, it is generally customary to add the additives to the make-up or fresh water lines where the water enters the system.

While this invention has been described by a number of specific embodiments, it is obvious there are other modifications which can be made without departing from the spirit and scope of the invention as set forth in the appended claims.

The invention claimed is:

1. A method of inhibiting the deposit of scale and sludge in boiler water which comprises adding to said boiler water
   (a) from about 0.01 to 100 parts permillion parts by weight of the water in the boiler of 2-phosphonobutane-1,2,4 tricarboxylic acid or the metal salts thereof, and
   (b) from about 0.01 to 500 parts by weight of the water of a mixture of (i) at least one acrylic polymer having an average molecular weight ranging from 1000 to about 10 million selected from the group consisting of homopolymers of acrylic acid and methacrylic acid, and (ii) a sulfonated styrene-maleic anhydride copolymer having a molecular weight such that it is soluble in water and functions as a dispersant, with the ratio of said acrylic polymer to said sulfonated copolymer in said mixture being such that a given weight concentration of said mixture provides, in combination with said 2-phosphonobutane-1,2,4 tricarboxylic acid compound, an efficacy of inhibition greater than that provided by an equal weight concentration of acrylic polymer above or the sulfonated copolymer above.

2. The method of claim 1 futher characterized in that the acrylic acid and methacrylic acid polymers are employed in amounts ranging from about 0.1 to about 100 parts by weight per million parts by weight of the water.

3. The method of claim 1 further characterized in that the mixture includes a homopolymer of acrylic acid.

* * * * *